(12) United States Patent
Daigle et al.

(10) Patent No.: US 8,393,537 B2
(45) Date of Patent: *Mar. 12, 2013

(54) METHODS, SYSTEMS AND COMPUTER PROGRAM PRODUCTS FOR ELECTRONIC IDENTIFICATION CARD CREATION AND TRANSFER DURING REAL TIME COMMUNICATIONS

(75) Inventors: Brian Daigle, Marietta, GA (US); Jerry Liu, Atlanta, GA (US)

(73) Assignee: AT&T Intellectual I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/616,096

(22) Filed: Sep. 14, 2012

(65) Prior Publication Data

US 2013/0008970 A1 Jan. 10, 2013

Related U.S. Application Data

(63) Continuation of application No. 13/016,441, filed on Jan. 28, 2011, now Pat. No. 8,286,866, and a continuation of application No. 12/272,868, filed on Nov. 18, 2008, now Pat. No. 7,896,240, and a continuation of application No. 11/323,491, filed on Dec. 30, 2005, now Pat. No. 7,451,922.

(51) Int. Cl.
*G06K 5/00* (2006.01)
(52) U.S. Cl. ...................................................... 235/380
(58) Field of Classification Search .................. 235/375, 235/380, 492
See application file for complete search history.

(56) References Cited

U.S. PATENT DOCUMENTS

| | | | |
|---|---|---|---|
| 6,254,001 B1 | 7/2001 | Chan | |
| 7,387,234 B2 | 6/2008 | Kanatani et al. | |
| 7,451,922 B2 | 11/2008 | Daigle et al. | |
| 2002/0151326 A1 | 10/2002 | Awada et al. | |
| 2002/0169806 A1 | 11/2002 | Wang et al. | |
| 2005/0096071 A1 | 5/2005 | Lin et al. | |
| 2006/0075050 A1 | 4/2006 | Kanatani et al. | |
| 2006/0106646 A1 | 5/2006 | Squilla et al. | |

*Primary Examiner* — Seung Lee
(74) *Attorney, Agent, or Firm* — Cantor Colburn LLP

(57) ABSTRACT

A method for creating an electronic identification card during a real time communications session including: presenting a user with an option to enter personal information; receiving a command from the user to send the electronic identification card including the personal information during the real time communications session; recording the personal information for the electronic identification card with a data entry method; and sending the electronic identification card to a device involved in the real time communications session.

15 Claims, 4 Drawing Sheets

METHODS, SYSTEMS AND COMPUTER PROGRAM PRODUCTS FOR ELECTRONIC IDENTIFICATION CARD CREATION AND TRANSFER DURING REAL TIME COMMUNICATIONS

CROSS-REFERENCE TO RELATED APPLICATIONS

This application is a continuation of U.S. patent application Ser. No. 13/016,441 filed Jan. 28, 2011, the contents of which are incorporated by reference herein in their entirety, which is a continuation of U.S. patent application Ser. No. 12/272,868 filed Nov. 18, 2008, now U.S. Pat. No. 7,896,240, the contents of which are incorporated by reference herein in their entirety, which is a continuation of U.S. patent application Ser. No. 11/323,491 filed Dec. 30, 2005, now U.S. Pat. No. 7,451,922, the contents of which are incorporated by reference herein in their entirety.

BACKGROUND

The present invention relates in general to the field of real time communications, and in particular to the transfer and creation of personal information during real time communications.

With the advent of pagers and mobile phones the wireless service industry has grown into a multi-billion dollar industry. Recently, duplex wireless devices have grown in popularity. Duplex wireless devices allow for the exchange of voice and other information over the same channel. This is advantageous for multi-use wireless devices that perform other non-telephony functions such as the administering of contact information, calendar information, cataloging of images, video and audio. Users of multi-use wireless devices take advantage of the duplex nature of their products to talk and to exchange information. Current multi-use wireless devices, however, do not come without their drawbacks.

One problem with current multi-use wireless devices is that voice and data cannot be transmitted at the same time. That is, one function must be suspended in order to perform the other function. Thus, if a first party is currently involved in a telephone call and he desires to send a file to the other party via the wireless device, the first party must suspend his telephone call in order to send the file. In addition to wireless devices, many other communication devices also suffer from similar drawbacks.

In today's global business environment, with the wide proliferation of wireless devices and the frequency with which business is conducted over these wireless devices, a large number of business contacts are made over the wireless devices. Consequently, a person is often not in the physical presence of his new contact (customer or client) and thus, when conducting business via a cellular phone, the person is unable to immediately present a business card to the contact. Therefore, the person has to resort to mailing the business card to the contact or providing his contact information verbally over the wireless devices. This mode of establishing new business contacts is not desirable, since it involves extra steps to get the business card to the contact and/or forces the contact to have to write the information down on a sheet of paper. With present cellular phone design, caller ID information is provided to a call recipient when a call is received on the recipient's cellular phone. The identified number may then be stored on the recipient's phone. However, this information is often limited to the caller's number, and the caller's name is often not provided for the recipient to recognize this number for later contact, the call recipient has to manually enter the remaining data that may be relevant, such as the caller's name and address, etc.

SUMMARY

Exemplary embodiments include a method for creating an electronic identification card during a real time communications session including: presenting a user with an option to enter personal information; receiving a command from the user to send the electronic identification card including the personal information during the real time communications session; recording the personal information for the electronic identification card with a data entry method; and sending the electronic identification card to a device involved in the real time communications session.

Exemplary embodiments also include a system for creating and transferring an electronic identification card during real time communications including: means for establishing a real time communications session between a first and second devices; means for presenting a user of the first device with an option to create an electronic identification card; means for receiving a command from the user of the first device to create the electronic identification card; means for creating the electronic identification card; and means for transferring the electronic identification card to the second device.

Exemplary embodiments further include a computer program product for creating an electronic identification card during a real time communications session, the computer program product including: a storage medium readable by a processing circuit and storing instructions for execution by the processing circuit for facilitating a method including: presenting a user with an option to enter personal information; receiving a command from the user to send the electronic identification card including the personal information during the real time communications session; recording the personal information for the electronic identification card with a data entry method; and sending the electronic identification card to a device involved in the real time communications session.

Other systems, methods, and/or computer program products according to exemplary embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Referring now to the drawings wherein like elements are numbered alike in the several Figures.

DETAILED DESCRIPTION

Referring now to the Figures for the purpose of illustrating the invention and not for the purpose of limiting the same, it is to be understood that standard components or features that are within the purview of an artisan of ordinary skill and do not contribute to the understanding of the various embodiments of the invention are omitted from the Figures to enhance clarity.

According to an exemplary embodiment, personal information in the form of an electronic identification card, also referred to herein as an "electronic business card" or a "v-card" for illustrative purposes, is created and transferred during real time communications. The electronic business card may be in any format including, but not limited to, a .vcd as used by Microsoft™ Outlook™, a .txt file, a .csv data file, or an images file such as a .jpeg or .bmp. The v-card may contain various information about a person including, but not limited to, a name, a home address, a work address, a work phone number, a home phone number, a work email address, a personal email address, a fax number, a mobile number, an instant message screen name, and a photo of the person.

Figure 1:
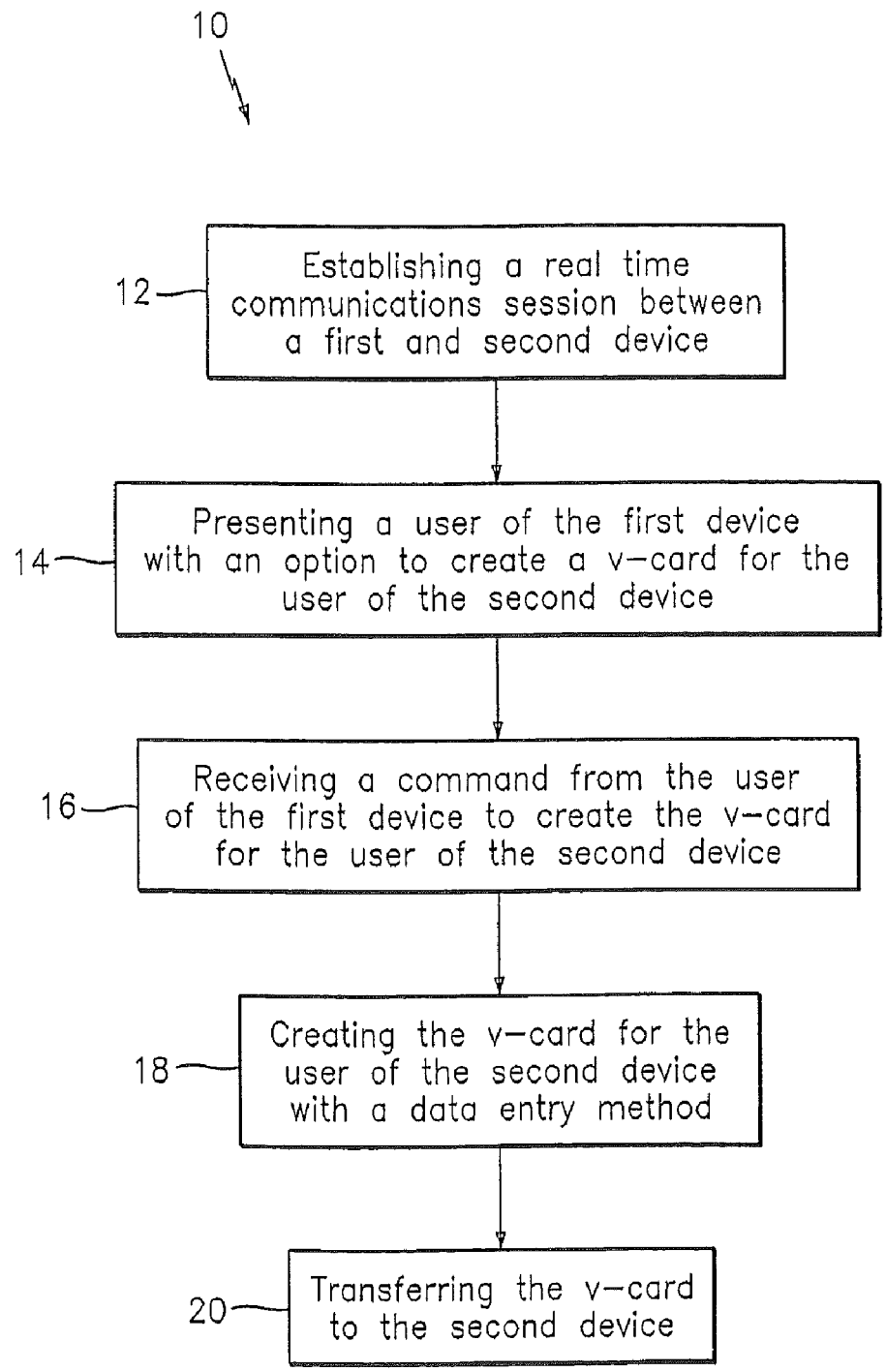
FIG. 1 is a flowchart of the operation of the method for transferring an electronic identification card during real time communications in exemplary embodiments.

Referring now to FIG. 1, a flowchart of the operation of the method for creating and transferring an electronic business card during real time communications in exemplary embodiments is generally depicted as 10. The method for creating and transferring the electronic business card during real time communications 10 includes establishing a connection between first and second devices, as shown at step 12. A user of the first device is presented with an option to create an electronic business card for the user of the second device, as shown at step 14. At step 16, the method for creating and transferring the electronic business card during real time communications 10 includes receiving a command from a user of the first device to create an electronic business card for the user of the second device. After receiving the command from the first user, the method for creating and transferring the electronic business card during real time communications 10 creates an electronic business card for the user of the second device, as shown at step 18. The electronic business card may be created using a variety of data entry methods described herein in further detail. At step 20, the method for creating and transferring the electronic business card during real time communications 10 concludes by transferring the electronic business card of the user of the first device to the second device.

Figure 2:
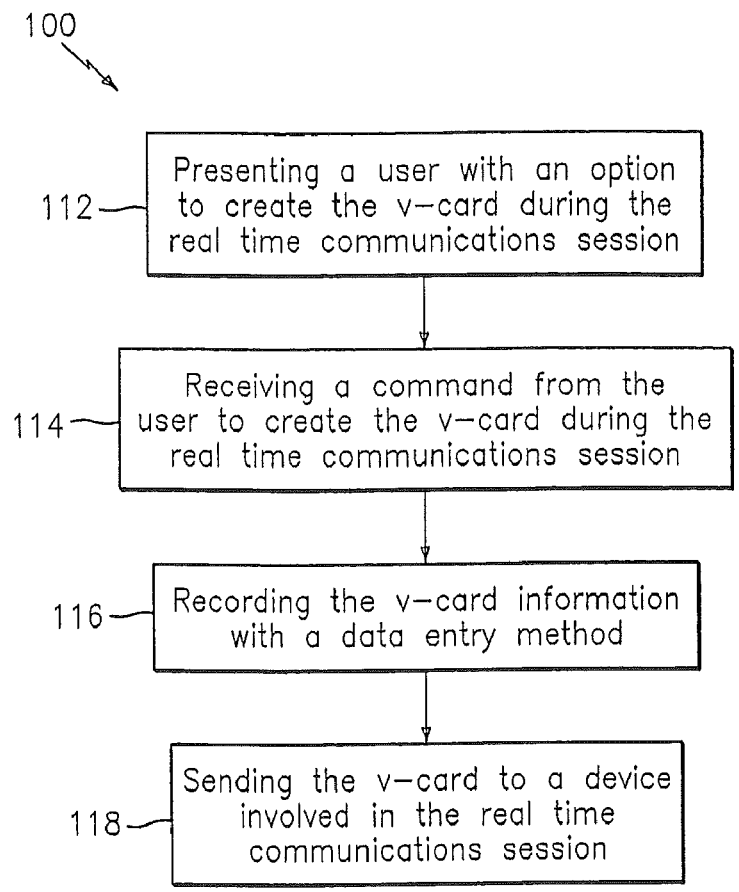
FIG. 2 is a flowchart of the operation of the method for creating an electronic identification card during real time communications in exemplary embodiments.

Referring now to FIG. 2, a flowchart of the operation of the method for creating an electronic business card during real time communications in exemplary embodiments is generally depicted as 100. The method for creating an electronic business card during real time communications 100 includes presenting a user with an option to create the electronic business card during the real time communications session, as shown at step 112. Shown at step 114, the method for creating an electronic business card during real time communications 100 includes receiving a command from the user to create the electronic business card during the real time communications session. The method for creating an electronic business card during real time communications 100 also includes recording the electronic business card information with a data entry method, as shown at step 116. At step 118 the method for creating an electronic business card during real time communications 100 concludes by sending the electronic business card created at step 116 to a device involved in the real time communications session.

Figure 3:
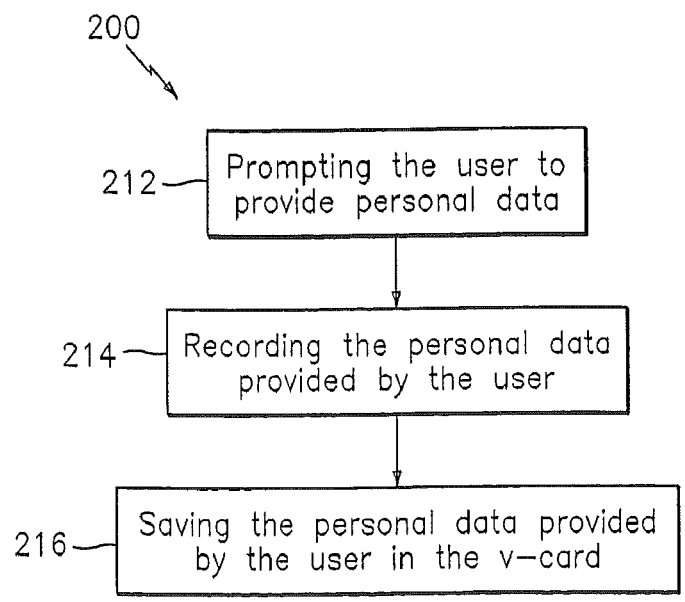
FIG. 3 is a flowchart of the operation of the data entry method for creating an electronic identification card in exemplary embodiments.

Turning now to FIG. 3, a flowchart of the operation of the data entry method for creating an electronic business card in exemplary embodiments is generally depicted as 200. The data entry method 200 includes prompting the user to provide personal information, as shown at step 212. In an exemplary embodiment, during the middle of a phone conversation, a user of a soft phone or a SIP phone may indicate that he or she is requesting an electronic business card by selecting a "request electronic business card" button on a soft phone interface or SIP phone interface, or by selecting a sequence of numbers on a POTS phone. Once the electronic business card has been requested, the user whose electronic business card was requested may be prompted to provide his/her electronic business card to the requestor. As shown at step 214 the information entry method 200 also includes recording the personal information provided by the user. In exemplary embodiments, the prompt can be by way of dialog box in a soft phone interface or by way of a SIP phone's display. In other exemplary embodiments, the real time communication session between the two users can be maintained example (e.g., placed on hold) while an intelligent voice recognition system prompts the user for the requested personal information. At step 216, the data entry method 200 saves the personal information provided by the user in the electronic business card. The personal information may be saved using a DTMF recognition algorithm or a speech recognition algorithm, depending upon the method that the user chooses to provide the personal information. In exemplary embodiments, the user is iteratively prompted to enter personal information including, but not limited to, name, address, phone number, email address, fax number, mobile number, instant message screen name, etc. Upon conclusion, the data entry method 200 returns the users to their conversation and the electronic business card transfer is completed. The electronic business card can be transferred to the requestor through various methods including, but not limited to, a short message service, an email, a file transport protocol, or the like. Upon receipt of the electronic business card, the requestor may be presented with the contents of the electronic business card and be prompted to save or discard the electronic business card.

In exemplary embodiments, various devices may be used for the real time communications session including, but not limited to, a traditional phone, a wireless phone, a PDA, a computer, a Blackberry, or any other device capable of real time communications. The real time communications may include a phone conversation, an instant messaging chat, a videoconference, or the like. Additionally, the device may include a database of electronic business cards that is used to organize contacts. For example, a wireless phone may use a database of electronic business cards to implement a phone book feature of the phone.

In exemplary embodiments, depending on the preference of the user and the type of the device that the user is using for the communications session, the personal information may be provided in various ways. For example, if the user is using traditional phone the personal information may be entered using the DTMF keypad or orally depending upon the preference of the user. Additionally, if the user is using a device such as a Blackberry or PDA, the personal information may be provided with a full keyboard or a stylus. In other exemplary embodiments, the device can be a computer, the communications session can be and Instant Messaging (IM) session, and the personal information can be entered via a keyboard.

Figure 4A:
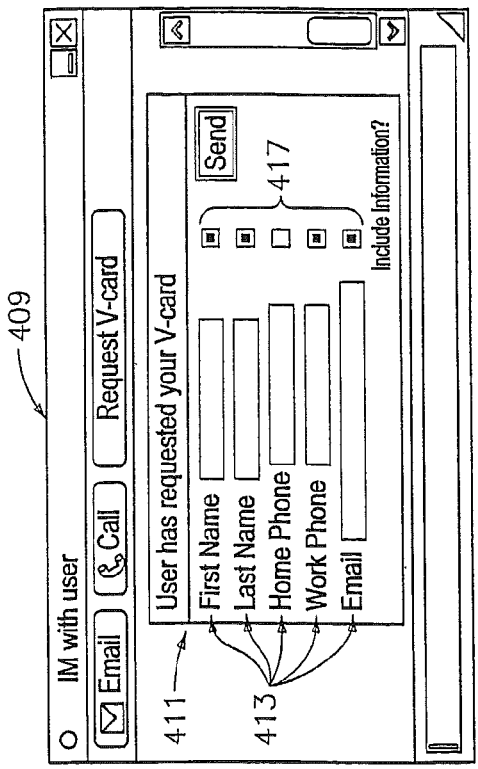
FIGS. 4(a)-(d) illustrate an Instant Messaging (IM) user interface in accordance with exemplary embodiments.
Figure 4B:
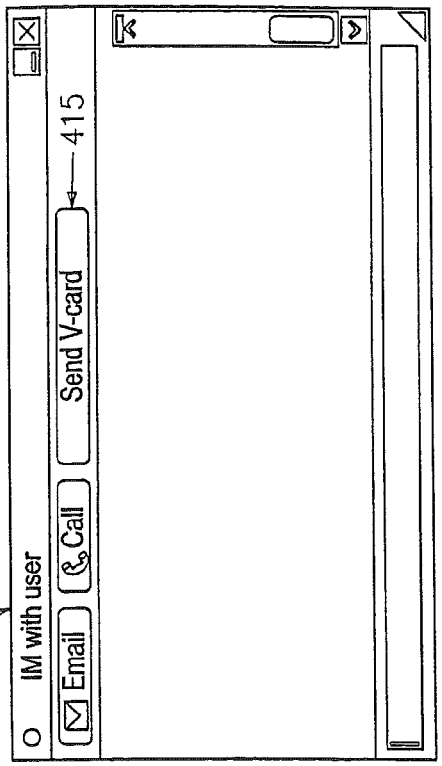
Figure 4C:
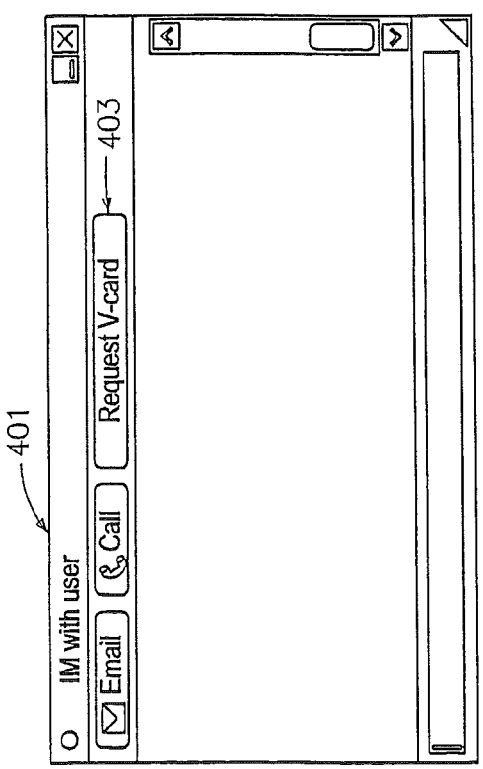
Figure 4D:
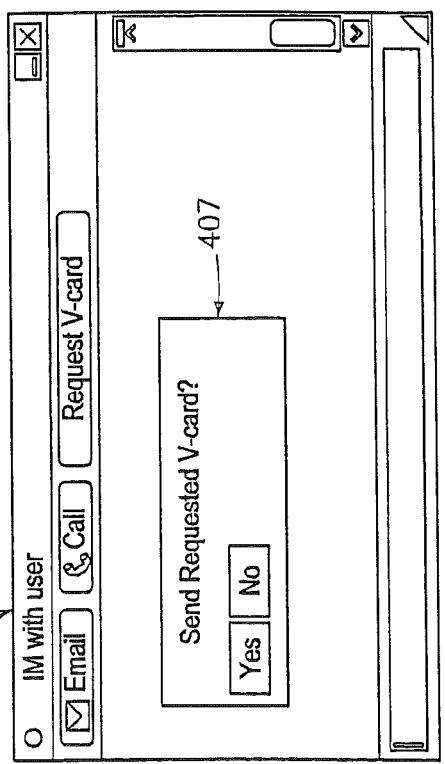

Referring now to FIGS. 4A-D, an IM user interface in accordance with exemplary embodiments is illustrated. In exemplary embodiments, the real time communications session can be an IM session between two users and the IM user interface 401 can include an option to request an electronic business card 403 from another user, as shown in FIG. 4A. Once a user has requested an electronic business card from another user, the requestee's computer may perform a search for the requested electronic business card and upon locating the requested electronic business card the computer may send the electronic business card to the requestor, either automatically or upon approval from the requestee. The IM user interface 405 may use a dialog box 407 to request approval for sending the electronic business card, as shown in FIG. 4B. Additionally, if the requestee's computer does not locate the requested electronic business card the requestee can be prompted to enter electronic business card information for example into fields 413. The IM user interface 409 may use a dialog box 411 to allow the requestee to enter his/her personal information, as shown in FIG. 4C. After entering in his/her personal information, the user may choose to save the information entered into a contact or V-card, for example by hitting a "save" option (not shown). Alternatively, any of the information entered into each field can be saved as a V-card or electronic contact upon the V-card being sent, regardless of whether the user chooses to send that information by selection prompts 417 (see below). Once saved, the V-card or electronic contact may thereafter be detected and sent when a subsequent request for the user's V-card is received. In exemplary embodiments, the dialog box 411 may automatically retrieve the user's personal information from a cache, as mentioned below. In additional exemplary embodiments, as mentioned below, the dialog box 411 may allow the user to selectively include specific pieces of personal information to be included in the electronic business card transferred to the requestor. Furthermore, the IM user interface 419 can include a send electronic business card option 415 that allows a user to send their electronic business card to another user of the IM service, as shown in FIG. 4D. In exemplary embodiments, the IM application can have a default electronic business card that is associated with the user.

In additional exemplary embodiments, a user may be presented with an option to selectively include various fields in the electronic business card that is going to be transferred. Electronic business cards may contain a lot of personal information that a user may not wish to provide to the person that he is transferring the electronic business card to. For example, the person requesting the electronic business card may be a business contact and the requestor may not wish to provide the requestor with his home address or home phone number. Likewise, the user may opt to not provide specific information during the creation of an electronic business card during a real time communications session. If a user from which an electronic business card has been requested already has an electronic business card or contact information on their client device (for example, in Outlook or IM), then an interface, such as the dialog box 411 as depicted in FIG. 4C, may be presented to the user in which fields are filled in based on the electronic business card or contact information. The dialog box 411 may also include one or more selection prompts 417 to selectively include what information to include in the transmission of his or her electronic business card to the requesting party. With reference to the exemplary user interface of FIG. 4D, a similar interface to that of FIG. 4C may be presented to a user if he or she selects the "Send V-card" option 415.

In another exemplary embodiment in which a user does have V-card or contact information associated with the user stored (either locally or on a network), a user interface, for example the user interface of FIG. 4C, may be presented in which one or more of the fields 413 has been automatically populated using any V-card or contact information that already exists for that user. This may allow the user to glance at the information associated with his or her existing V-card, and to make selections through selection prompts 417 as to what information he or she wishes to include in the transmission of the V-card. As explained above, the user interface of FIG. 4C may be presented either when a V-card has been requested of the user or when a user chooses to send a V-card.

In exemplary embodiments, a user may be able to set preferences that automatically handle requests for his/her electronic business card and the receipt of both requested and un-requested electronic business cards. For example, the user may select a default electronic business card to be sent upon the receipt of a request for his/her electronic business card and the user may also select whether or not to be presented with a dialog box that allows the selective inclusion of specific information in the electronic business card being sent in response to a request. Additionally, the user may select a default storage location for received electronic business cards and may set a preference of alerting the user to the receipt of an electronic business card. In exemplary embodiments, the user may elect to treat requested and not requested electronic business cards differently. For example, the user may wish to automatically save requested electronic business cards without being alerted to the receipt of the electronic business card while opting to alert the user to the receipt of non-requested electronic business cards and prompting the user to either save or discard the electronic business card.

Figure 5:
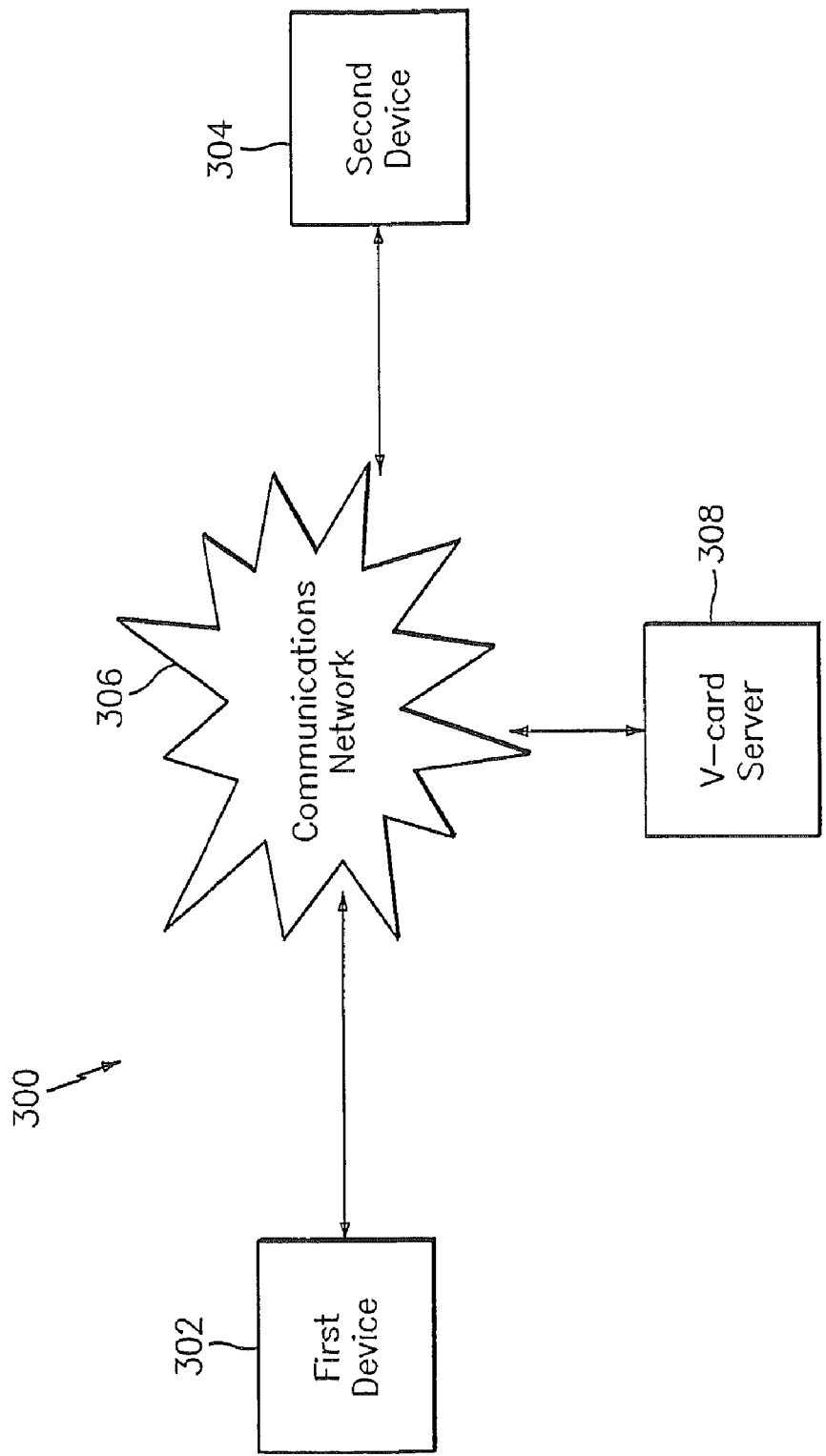
FIG. 5 is a block diagram of a system for creating and transferring electronic identification cards during real time communications in exemplary embodiments.

Turning now to FIG. 5, a system for creating and transferring electronic business cards during real time communications in exemplary embodiments is depicted generally as 300. The system for creating and transferring electronic business cards during real time communications includes a first communications device 302, a second communications device 304, a communications network 306, and an electronic business card server 308. In exemplary embodiments, the first and second communication devices 302 and 304 are involved in a real time communications session over the communications network 306. As explained above, various communication devices may be used for the real time communications session including, but not limited to, a traditional phone, a wireless phone, a PDA, a computer, a Blackberry, or any other device capable of real time communications. The real time communications may include a phone conversation, an instant messaging chat, a videoconference, or the like. Additionally, the device may include a database of electronic business cards that is used to organize contacts. For example, a wireless phone may use a database of electronic business cards to implement a phone book feature of the phone. In the embodiment shown in FIG. 5, the communication devices 302 and 304 are wireless devices. The communications network 306 is in operable communication with the electronic business card server 308, which upon the receipt of a request from either the first and second wireless devices 302 and 304 creates an electronic business card. In exemplary embodiments, the electronic business card server 308 may use the method for creating an electronic business card during real time communications 100 (FIG. 2) to create an electronic business card. After creating an electronic business card, the electronic business card server 308 can transfer the electronic business card to either or both of the first and second wireless devices 302 and 304 over the communications network 306. In exemplary embodiments, the communications network 306 may include, but is not limited to, a Plain Old Telephone System (POTS), the Internet, an Intranet, a wireless telephone network, or the like.

In exemplary embodiments, a first user may request that a second user provide an electronic business card to the first user and the second user is not capable of providing an electronic business card to the first user for various reasons. The first user may request the electronic business card information from the second user and create an electronic business card for the second user based upon the second users responses. For example, a person using a Plain Old Telephone Service (POTS) connection may not be able to transfer an electronic business card to someone that they are on the phone with; the other party may request that the person provide each piece of electronic business card information separately. The electronic business card requestor can use various methods to capture and store the pieces of electronic business card information including voice recognition software. In exemplary embodiments, the requestor may utilize a program that automatically prompts, receives, and stores the electronic business card information. The electronic business card may be locally stored or can be sent to another device for storage (e.g., the electronic business card can be emailed to an email account and stored in a contacts database).

As described above, embodiments may be in the form of computer-implemented processes and apparatuses for practicing those processes. In exemplary embodiments, the invention is embodied in computer program code executed by one or more network elements. Embodiments include computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims.

What is claimed is:

1. A method for creating an electronic identification card, comprising:
    presenting a user with an option to enter personal information;
    recording the personal information for the electronic identification card with a data entry method;
    receiving a command from the user to send the electronic identification card including the personal information during a communications session;
    placing the communication session on hold; and
    sending the electronic identification card to a device involved in the communications session;
    wherein the device is a wireless device;
    wherein the electronic identification card is an electronic business card.

2. The method of claim 1, wherein the personal information includes a name of a person.

3. The method of claim 1, wherein the data entry method comprises:
    prompting the user to provide the personal information;
    recording the personal information provided by the user; and
    saving the personal information provided by the user in the electronic identification card.

4. The method of claim 3, wherein the personal information is recorded using a dual tone multi-frequency input recognition algorithm.

5. The method of claim 3, wherein the personal information is recorded using a speech recognition algorithm.

6. The method of claim 1 further comprising presenting the user with an option to selectively include personal information in the electronic identification card.

7. A system for creating and transferring an electronic identification card, comprising:
    means for presenting a user of a first device with an option to create the electronic identification card;
    means for receiving a command from the user of the first device to create the electronic identification card;
    means for creating the electronic identification card through the first device;
    means for establishing a communications session between the first device and a second device;
    means for placing the communication session on hold; and
    means for transferring the electronic identification card to the second device;
    wherein the first device is a wireless device;
    wherein the electronic identification card is an electronic business card.

8. The system of claim 7, wherein the electronic identification card includes a name of a person.

9. The system of claim 8, wherein the first device comprises a database of electronic identification cards for organizing contacts.

10. A computer program product for creating an electronic identification card, the computer program product comprising:
    a non-transitory storage medium readable by a processing circuit and storing instructions for execution by the processing circuit for facilitating a method comprising:
    presenting a user with an option to enter personal information;
    recording the personal information for the electronic identification card with a data entry method;
    receiving a command from the user to send the electronic identification card including the personal information during a communications session;
    presenting the user with a prompt to exclude a portion of the personal information from the electronic identification card; and
    sending the electronic identification card to a device involved in the communications session;
    wherein the device is a wireless device;
    wherein the electronic identification card is an electronic business card.

11. The computer program product of claim 10, wherein the personal information includes a name of a person.

12. The computer program product of claim 10, wherein the data entry method comprises:
    prompting the user to provide the personal information;
    recording the personal information provided by the user; and saving the personal information provided by the user in the electronic identification card.

13. The computer program product of claim 12, wherein the personal information is recorded using a dual tone multi-frequency input recognition algorithm.

14. The computer program product of claim 12, wherein the personal information is recorded using a speech recognition algorithm.

15. The computer program product of claim 10 further comprising presenting the user with an option to selectively include personal information in the electronic identification card.

* * * * *